US009809735B2

(12) United States Patent
Yoshihara et al.

(10) Patent No.: US 9,809,735 B2
(45) Date of Patent: Nov. 7, 2017

(54) HIGHLY-THERMALLY-CONDUCTIVE RESIN COMPOSITION, AND RESIN MATERIAL FOR HEAT DISSIPATION/HEAT TRANSFER AND THERMALLY CONDUCTIVE FILM COMPRISING SAME (71) Applicant: Kaneka Corporation, Osaka (JP)

(72) Inventors: Shusuke Yoshihara, Osaka (JP); Syoji Ubukata, Osaka (JP); Kazuaki Matsumoto, Osaka (JP)

(73) Assignee: Kaneka Corporation (JP)

( * ) Notice: Subject to any disclaimer, the term of this patent is extended or adjusted under 35 U.S.C. 154(b) by 0 days.

(21) Appl. No.: 15/101,270

(22) PCT Filed: Nov. 13, 2014

(86) PCT No.: PCT/JP2014/080115
§ 371 (c)(1),
(2) Date: Jun. 2, 2016

(87) PCT Pub. No.: WO2015/083523
PCT Pub. Date: Jun. 11, 2015

(65) Prior Publication Data
US 2016/0304762 A1 Oct. 20, 2016

(30) Foreign Application Priority Data

Dec. 4, 2013 (JP) .................. 2013-251286

(51) Int. Cl.
C08G 64/00 (2006.01)
C09K 5/14 (2006.01)
C08K 3/04 (2006.01)
C08K 3/22 (2006.01)
C08K 3/28 (2006.01)
C08K 3/38 (2006.01)
C08G 63/185 (2006.01)
C08G 63/193 (2006.01)
C08G 63/78 (2006.01)
C08J 5/18 (2006.01)
C08K 7/18 (2006.01)
C08G 63/02 (2006.01)

(52) U.S. Cl.
CPC .............. C09K 5/14 (2013.01); C08G 63/185 (2013.01); C08G 63/193 (2013.01); C08G 63/78 (2013.01); C08J 5/18 (2013.01); C08K 3/04 (2013.01); C08K 3/22 (2013.01); C08K 3/28 (2013.01); C08K 3/38 (2013.01); C08K 7/18 (2013.01); C08J 2367/02 (2013.01); C08K 2003/222 (2013.01); C08K 2003/2227 (2013.01); C08K 2003/282 (2013.01); C08K 2003/385 (2013.01); C08K 2201/001 (2013.01); C08K 2201/005 (2013.01)

(58) Field of Classification Search
CPC ....................................................... C09K 5/14

USPC .................................................. 528/193, 194
See application file for complete search history.

(56) References Cited

U.S. PATENT DOCUMENTS

| 5,302,689 A | 4/1994 | Tsai |
| 2004/0147709 A1 | 7/2004 | Akatsuka et al. |
| 2006/0276568 A1 | 12/2006 | Akatsuka et al. |
| 2010/0016498 A1 | 1/2010 | Kaji et al. |
| 2011/0204282 A1 | 8/2011 | Yoshihara et al. |
| 2013/0035468 A1 | 2/2013 | Yoshihara et al. |
| 2013/0043425 A1 | 2/2013 | Yoshihara et al. |
| 2013/0313468 A1 | 11/2013 | Nakamura et al. |

FOREIGN PATENT DOCUMENTS

| CN | 102203183 A | 9/2011 | |
| CN | 103370355 A | 10/2013 | |
| IT | GB 001493214 | * 11/1977 | ............. C08G 59/00 |
| JP | H08-113719 A | 5/1996 | |
| JP | 2006057005 | * 3/2006 | ............. C08L 87/00 |
| JP | 2008-150525 A | 7/2008 | |
| JP | 2010-037474 A | 2/2010 | |
| JP | 2011-231159 A | 11/2011 | |
| JP | 2013-170202 A | 9/2013 | |
| JP | 2013-221117 A | 10/2013 | |
| WO | 02094905 A1 | 11/2002 | |
| WO | 2006120993 A1 | 11/2006 | |
| WO | 2010050202 A1 | 5/2010 | |
| WO | 2011132389 A1 | 10/2011 | |
| WO | 2011132390 A1 | 10/2011 | |

OTHER PUBLICATIONS

JP 2006057005 Mar. 2006, machine translation.*
GB 1493214 Abstract; Process for the Recovery of Diepdxides From Liquid Epdxy Resins; Nov. 30, 1977.*
Watanabe, J. and Krigbaum, W, Crystalline and Liquid Crystal Transitions of Mesogenic Polymer Mixtures and Random Copolymers, Macromolecules, vol. 17, p. 2288-2295 (1984).
International Search Report for Application No. PCT/JP2014/080115 dated Jan. 13, 2015.

* cited by examiner

Primary Examiner — Terressa Boykin
(74) Attorney, Agent, or Firm — Lerner, David, Littenberg, Krumholz & Mentlik, LLP (57) ABSTRACT The present invention relates to: (i) a resin composition having excellent thermal conductivity and capable of being processed into a thin-walled and flexible molded article, the resin composition containing: (a) a resin consisting of 40 to 60 mol % of a unit (A) having a biphenyl group, and 5 to 40 mol % of a linear unit (B), and 5 to 40 mol % of a linear unit (C), where a thermal conductivity of the resin itself is not less than 0.4 W/(m·K); and (b) an inorganic filler having thermal conductivity of not less than 1 W/(m·K), (ii) a heat-dissipating or heat-transferring resin material containing the resin composition, and (iii) a thermally conductive membrane containing the resin composition.

10 Claims, 1 Drawing Sheet

HIGHLY-THERMALLY-CONDUCTIVE RESIN COMPOSITION, AND RESIN MATERIAL FOR HEAT DISSIPATION/HEAT TRANSFER AND THERMALLY CONDUCTIVE FILM COMPRISING SAME

CROSS-REFERENCE TO RELATED APPLICATIONS

The present application is a national phase entry under 35 U.S.C. § 371 of International Application No. PCT/JP2014/080115 filed Nov. 13, 2014, published as International Publication No. WO 2015/083523 A1, which claims priority from Japanese Patent Application No. 2013-251286 filed Dec. 4, 2013, all of which are incorporated herein by reference.

Technical Field

The present invention relates to (i) a resin composition having excellent thermal conductivity and capable of being processed into a thin-walled and flexible molded article, (ii) a heat-dissipating or heat-transferring resin material containing the resin composition, and (iii) a thermally conductive membrane containing the resin composition.

Background Art

Plastic has low thermal conductivity than inorganic substances such as metal materials. This can give rise to a problem that generated heat is not easily dissipated when a resin composition is used for various items such as casings of personal computers and displays, materials of electronic devices, and automotive interiors and exteriors. In order to solve this problem, attempts have been widely made to obtain a highly thermally conductive resin composition by blending, in a resin, a large amount of a highly thermally conductive inorganic substance. In order to obtain such a highly thermally conductive resin composition, it is necessary to blend, in a resin, a highly thermally conductive inorganic substance such as graphite, carbon fiber, alumina, or boron nitride generally in an amount of not less than 30 vol % and further in an amount of as much as not less than 50 vol %.

Unfortunately, blending a large amount of inorganic substance in a resin increases a specific gravity of a resin composition. This results in, for example, a drawback of deteriorating molding processability. Further, since the resin itself has low thermal conductivity, there has been a limit to the extent to which a thermal conductivity of a resin composition is increased even when a large amount of inorganic substance is blended. For this reason, there has been a demand for increasing the thermal conductivity of the resin itself.

For example, an epoxy resin described in Patent Literature 1 has been reported as a thermosetting resin in which a resin itself has excellent thermal conductivity. The resin has a certain level of thermal conductivity, but has a complex molecular structure. As such, it is difficult to produce such a resin. An epoxy resin described in Patent Literature 2 is relatively simple to be synthesized. However, the epoxy resin has an insufficient thermal conductivity.

Meanwhile, regarding a thermoplastic resin, Patent Literature 3 discloses a resin molded article having a high thermal conductivity in a direction in which thermal liquid crystalline polyester is oriented. Such a resin molded article is obtained by causing the thermal liquid crystalline polyester to be oriented by at least one external field selected from a flow field, a shear field, a magnetic field, and an electric field. The resin molded article is highly thermally conductive in one axial direction, but is poorly thermally conductive in the other two axial directions. Further, in order to obtain a desired thermal conductivity of the resin molded article, the use of the magnetic field requires a magnetic flux density of at least three teslas or more. This makes it difficult to produce the resin molded article.

As for a thermoplastic resin having excellent thermal conductivity of a resin itself, Patent Literatures 4 to 6 describe alternating polycondensation products of mesogenic groups and bending chains. Those polyesters have been known to contain mesogenic groups and to show high crystallinity and a high thermal conductivity due to their orderly molecular structures. On the other hand, the polyesters, which are firm and fragile, have been required especially to increase molding processability of being processed into a thin-walled membrane molded article. Non-Patent Literature 1 examines a phase transition temperature and crystallinity of a random copolyester of biphenol, which is a mesogenic group, and two types of aliphatic dicarboxylic acids. Non-Patent Literature 1 describes that disturbing a molecular structure by copolymerization greatly decreases crystallinity, but a smectic liquid crystallinity is maintained. However, no mentions are made of use of those polyesters for applications to thermally conductive materials or of compositions obtained by blending a thermally conductive inorganic filler in those polyesters, and no mention is also made of mechanical properties.

CITATION LIST

Patent Literature

[Patent Literature 1]
  International Patent Application Publication No. WO 2002/094905 (publication date: Nov. 28, 2002)
[Patent Literature 2]
  International Patent Application Publication No. WO 2006/120993 (publication date: Nov. 16, 2006)
[Patent Literature 3]
  Japanese Patent Application Publication, Tokukai, No. 2008-150525 (publication date: Jul. 3, 2008)
[Patent Literature 4]
  International Patent Application Publication No. WO 2010/050202 (publication date: May 6, 2010)
[Patent Literature 5]
  International Patent Application Publication No. WO 2011/132389 (publication date: Oct. 27, 2011)
[Patent Literature 6]
  International Patent Application Publication No. WO 2011/132390 (publication date: Oct. 27, 2011)

Non-Patent Literature

[Non-patent Literature 1]
  Macromolecules, vol. 17, P2288 (1984)

SUMMARY OF INVENTION

Technical Problem

It is an object of the present invention to provide (i) a resin composition having excellent thermal conductivity and capable of being processed into a thin-walled and flexible molded article, (ii) a heat-dissipating or heat-transferring resin material containing the resin composition, and (iii) a thermally conductive membrane containing the resin composition.

Solution to Problem

As a result of diligent studies, the inventors accomplished the present invention by finding (i) that a liquid crystalline resin with a specific structure in which biphenol and a bivalent linear unit are randomly copolymerized has a high thermal conductivity of a resin itself for its low crystallinity and (ii) that a resin composition containing such a liquid crystalline resin and an inorganic filler having a thermal conductivity of not less than 1 W(m·K) has high thermal conductivity and can be processed into a thin-walled and flexible molded article. That is, the present invention is the following 1) to 9).

1) A resin composition including:
a resin having a main chain structure including:
a unit (A) by 40 mol % to 60 mol %, the unit (A) having a biphenyl group and being represented by general formula (1):

[Chem. 1]

(1)

a unit (B) by 5 mol % to 40 mol %, the unit (B) being represented by general formula (2):

(2)

wherein $R_1$ represents a bivalent linear substituent (a) whose number of atoms in its main chain length is 2 to 18 and (b) which is branched or not branched; and
a unit (C) by 5 mol % to 40 mol %, the unit (C) being represented by general formula (3):

(3)

wherein $R_2$ represents a bivalent linear substituent (a) whose number of atoms in its main chain length is 4 to 20 and is larger than the number of atoms in the main chain length of $R_1$ and (b) which is branched or not branched,
where a total amount of the units (A), (B), and (C) is 100 mol %, and a thermal conductivity of the resin itself is not less than 0.4 W/(m·K); and
an inorganic filler having thermal conductivity of not less than 1 W/(m·K).

2) The resin composition as set forth in 1), wherein $R_1$ and $R_2$ of the resin are linear saturated aliphatic hydrocarbon chains.

3) The resin composition as set forth in 1) or 2), wherein $R_1$ and $R_2$ of the resin have respective main chain lengths of even numbers.

4) The resin composition as set forth in any one of 1) to 3), wherein $R_1$ and $R_2$ satisfies general formula (4):

$$n - m \geq 4 \quad (4)$$

where m represents the number of atoms in the main chain length of $R_1$, and n represents the number of atoms in the main chain length of $R_2$.

5) The resin composition as set forth in any one of 1) to 4), wherein the resin has a number average molecular weight of 3000 to 70000.

6) The resin composition as set forth in any one of 1) to 5), wherein the inorganic filler is one or more electrically-insulative highly thermally conductive inorganic compounds selected from the group consisting of boron nitride, aluminum nitride, silicon nitride, aluminum oxide, magnesium oxide, aluminum hydroxide, magnesium hydroxide, and diamond.

7) The resin composition as set forth in any one of 1) to 5), wherein the inorganic filler is one or more electrically-conductive highly thermally conductive inorganic compounds selected from the group consisting of graphite, a carbon nanotube, electrically-conductive metal powder, soft magnetism ferrite, carbon fiber, electrically-conductive metal fiber, and zinc oxide.

8) A heat-dissipating or heat-transferring resin material containing a resin composition as set forth in any one of 1) to 7).

9) A thermally conductive membrane containing a resin composition as set forth in any one of 1) to 7).

Advantageous Effects of Invention

A resin composition in accordance with the present invention has excellent thermal conductivity and is capable of being processed into a thin-walled and flexible molded article,

DESCRIPTION OF EMBODIMENTS

A resin composition in accordance with the present invention includes: a resin having a main chain structure including:
a unit (A) by 40 mol % to 60 mol %, the unit (A) having a biphenyl group and being represented by general formula (1):

[Chem. 2]

(1)

a unit (B) by 5 mol % to 40 mol %, the unit (B) being represented by general formula (2):

(2)

wherein $R_1$ represents a bivalent linear substituent (a) whose number of atoms in its main chain length is 2 to 18 and (b) which is branched or not branched; and
a unit (C) by 5 mol % to 40 mol %, the unit (C) being represented by general formula (3):

(3)

wherein $R_2$ represents a bivalent linear substituent (a) whose number of atoms in its main chain length is 4 to 20 and is larger than the number of atoms in the main chain length of $R_1$ and (b) which is branched or not branched,
where a total amount of the units (A), (B), and (C) is 100 mol %, and a thermal conductivity of the resin itself is not less than 0.4 W/(m·K); and an inorganic filler having thermal conductivity of not less than 1 W/(m·K).

Further, a resin composition in accordance with the present invention may be such that the resin composition includes: a resin having a main chain structure consisting of:

a unit (A) by 40 mol % to 60 mol %, the unit (A) having a biphenyl group and being represented by general formula (1):

[Chem. 3]

(1)

a unit (B) by 5 mol % to 40 mol %, the unit (B) being represented by general formula (2):

(2)

wherein $R_1$ represents a bivalent linear substituent (a) whose number of atoms in its main chain length is 2 to 18 and (b) which is branched or not branched; and a unit (C) by 5 mol % to 40 mol %, the unit (C) being represented by general formula (3):

(3)

wherein $R_2$ represents a bivalent linear substituent (a) whose number of atoms in its main chain length is 4 to 20 and is larger than the number of atoms in the main chain length of $R_1$ and (b) which is branched or not branched, where a total amount of the units (A), (B), and (C) is 100 mol %, and a thermal conductivity of the resin itself is not less than 0.4 W/(m·K); and an inorganic filler having thermal conductivity of not less than 1 W/(m·K).

A molar ratio (B)/(C) between the units (B) and (C) copolymerized in the resin used in the present invention is preferably 8/1 to 1/8, more preferably 6/1 to 1/4, further preferably 4/1 to 1/2, and most preferably 3/1 to 1/1. A molar ratio (B)/(C) ranging from 8/1 to 1/8 is preferable from the viewpoint that it inhibits an increase in degree of crystallinity of the resin and thus resists becoming brittle and facilitates securing flexibility of a molded thin wall. Further, an increase in copolymerization ratio of the unit (B), which has a smaller number of atoms in the main chain length, to the unit (C) is preferable for increasing an isotropic phase transition temperature of the resin and increasing heat resistance of the resin.

The resin used in the present invention preferably exhibits a smectic liquid crystal phase when heated. A resin exhibiting a liquid crystal phase is a generic term for resins that exhibit a liquid crystal phase at a certain temperature or above when heated. Typical types of liquid crystals include a nematic liquid crystal and a smectic liquid crystal. The nematic liquid crystal has constituent molecules that have an orientation order but that does not have a three dimensional positional order. On the other hand, the smectic liquid crystal has a layer structure in which molecules are aligned continuously so that molecular axes of the molecules are substantially parallel to one another. Further, in the layer structure, molecules in a portion where the molecules are aligned continuously so as to have molecular axes substantially parallel to one another have respective centroids in one plane. The smectic liquid crystal is also known to exhibit a specific pattern such as a short-rods-like (batonets) texture, a mosaic texture, or a fan-like texture in microscope observation under linearly polarized light. Generally, in a temperature rise process, the smectic liquid crystal molecules or resin exhibits, as thermophysical properties, a transition point (hereinafter, denoted by $T_s$) from a solid phase to a smectic liquid crystal phase and a transition point (hereinafter, denoted by $T_i$) from the smectic liquid crystal phase to an isotropic phase. Depending on a substance of which the smectic liquid crystal molecules or resin is made, the smectic liquid crystal molecules or resin may exhibit a transition point (hereinafter, denoted by $T_N$) from the smectic liquid crystal phase to the nematic liquid crystal phase at a temperature that is lower than $T_i$. These phase transition points can be observed as peak tops of endothermic peaks in a temperature rise process in differential scanning calorimetry (DSC).

The magnitude of resin crystallinity can be determined by phase transition enthalpy (ΔH) from an endothermic peak from a solid phase to a liquid crystal phase in the temperature rise process of the DSC. The higher ΔH, the higher the degree of crystallinity. The inventors found that the resin used in the present invention has a decreased orderliness of the molecular structure and a decreased degree of crystallinity due to copolymerization of the units (B) and (C) having different numbers of atoms in their respective main chains, but has a high thermal conductivity of resin per se, and achieves a remarkable increase in thermal conductivity when blended with a thermally conductive inorganic filler. This is considered to occur because the copolymerization slightly decreases the degree of liquid crystallinity and can form a micron-order anisotropic domain in which molecular chains are oriented, and because such a domain functions as an excellent thermal conductive path across the inorganic filler.

The polymer chain end structure of the resin used in the present invention is not particularly limited. However, polymer chain ends of the resin can be changed to carboxyl groups for the purpose of increasing compatibility with other resins or for the purpose of providing a thermosetting resin having solder reflow resistance with use of a curing agent that is a compound having other multifunctional reactive groups. In doing so, a proportion of the carboxyl groups with respect to all polymer chain ends is not less than 60 mol %, preferably not less than 70 mol %, more preferably not less than 80 mol %, and most preferably not less than 90 mol %. On the other hand, in order to increase hydrolysis resistance and long-term heat resistance of the resin, polymer chain ends can be blocked with a low-molecular-weight monofunctional compound. In doing so, a blocking ratio to all polymer chain ends is not less than 60%, preferably not less than 70%, more preferably 80%, and most preferably not less than 90%.

A polymer chain end blocking ratio of the resin can be determined by measuring the number of polymer chain end functional groups which are blocked in the resin and the number of polymer chain end functional groups which are not blocked in the resin, and then using the following equation (5). In terms of accuracy and convenience, the number of polymer chain end groups is preferably determined, through $^1$H-NMR, based on an integral value of a property signal corresponding to each polymer chain end group. Polymer chain end blocking ratio (%)=[number of blocked polymer chain end functional groups]/([number of blocked polymer chain end functional groups]+[number of non-blocked polymer chain end functional groups]) . . . (5).

From the viewpoint of increasing thermal conductivity of the resin, the end blocking agent is preferably a monoamine or aliphatic monocarboxylic acid having 1 to 20 carbon atoms, more preferably an aliphatic monocarboxylic acid having 1 to 20 carbon atoms, and further preferably an aliphatic monocarboxylic acid having 10 to 20 carbon atoms. Specific examples of the aliphatic monocarboxylic acid include aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid, and isobutyric acid; and any mixture of these aliphatic monocarboxylic acids. Among these aliphatic monocarboxylic acids, myristic acid, palmitic acid, and stearic acid are more preferable from the viewpoint of increasing especially thermal conductivity of the resin. Specific examples of the monoamine include aliphatic monoamines such as methylamine, ethylamine, propylamine, butylamine, hexylamine, octylamine, decylamine, stearylamine, dimethylamine, diethylamine, dipropylamine, and dibutylamine; and any mixture of these monoamines. Among these monoamines, butylamine, hexylamine, octylamine, decylamine, stearylamine, cyclohexylamine are more preferable from the viewpoint of reactivity, a high boiling point, stability of a blocked polymer chain end, price, and the like.

The resin used in the present invention is such that the thermal conductivity of the resin itself is not less than 0.4 W/(m·K) as a physical property value of an isotropic molded article, preferably not less than 0.5 W/(m·K), further preferably not less than 0.6 W/(m·K), particularly preferably not less than 0.7 W/(m·K), and most preferably not less than 0.8 W/(m·K). An upper limit of the thermal conductivity is not particularly limited, and it is preferable that the resin has a higher thermal conductivity. In a case where no physical treatment such as a magnetic field, voltage impression, rubbing, or extension is carried out in the molding, the thermal conductivity of the resin is generally not more than 30 W/(m·K), and further not more than 10 W/(m·K).

As used herein, the thermal conductivity of a resin itself is a value of a thermal conductivity measured for the resin itself by use of a thermal conductivity measuring device. Alternatively, the thermal conductivity of a resin itself may be a value obtained by directly measuring a thermal conductivity of a resin composition containing an isotropic inorganic filler in an amount of not more than 40 vol % and then calculating a thermal conductivity of a resin matrix from the following equation (6) (Bruggeman's theoretical formula):

$$1 - V = \{(\lambda_c - \lambda_f)/(\lambda_m - \lambda_f)\} \times (\lambda_m/\lambda_c)^{1/3} \quad (6)$$

where V is a volume content of the inorganic filler ($0 \leq V \leq 1$), $\lambda_c$ is a thermal conductivity of the resin composition, $\lambda_f$ is a thermal conductivity of the inorganic filler, and $\lambda_m$ is a thermal conductivity of the resin itself. Therefore, $\lambda_m$ can be calculated when V, $\lambda_c$, and $\lambda_f$ are known.

As an example of a method for determining whether thermal conductivities are isotropic, the following method is considered. That is, a resin or a resin composition is molded into a disk-shaped sample of 1 mm in thickness×25 mm φ, and thermal conductivities in the thickness direction of the disk-shaped sample and in the plane direction thereof at room temperature in the atmosphere are measured separately by a laser flash method thermal conductivity measuring device (manufactured by Netzsch Inc.; LFA447). In a case where these thermal conductivities are nearly equal, a molded article is isotropic.

In the following general formula (2):

$$—CO—R_1—CO— \quad (2),$$

$R_1$ represents a bivalent linear substituent (a) whose number of atoms in its main chain length is 2 to 18 and (b) which is branched or not branched. Here, the number of atoms in the main chain length is the number of atoms in a skeleton of the main chain. For example, assume that $—R_1—$ is $—(CH_2)_8—$. In such a case, the number of atoms in the main chain length is 8, which is the number of carbon atoms. For an increased thermal conductivity, $R_1$ is preferably a linear substituent that is not branched and further preferably a linear aliphatic hydrocarbon chain that is not branched. $R_1$ may be saturated or unsaturated and is preferably a saturated aliphatic hydrocarbon chain. $R_1$ containing no unsaturated bond allows a resin to obtain sufficient bendability and thus makes it easy to obtain a resin having a high thermal conductivity. $R_1$ is preferably a linear saturated aliphatic hydrocarbon chain having 2 to 18 carbon atoms, more preferably a linear saturated aliphatic hydrocarbon chain having 4 to 16 carbon atoms, and particularly preferably a linear saturated aliphatic hydrocarbon chain having 8 to 14 carbon atoms. $R_1$ preferably has a main chain length of an even number. With $R_1$ having a main chain length of an even number, it becomes easy to obtain a resin having a high thermal conductivity without having a decreased microscopic molecular orientation property. Especially, from the viewpoint of achieving a resin having excellent heat resistance and excellent thermal conductivity, $R_1$ is preferably one selected from $—(CH_2)_8—$, $—(CH_2)_{10}—$, and $—(CH_2)_{12}—$.

In the following general formula (3):

$$—CO—R_2—CO— \quad (3),$$

$R_2$ represents a bivalent linear substituent (a) whose number of atoms in its main chain length is 4 to 20 and is larger than the number of atoms in the main chain length of $R_1$ and (b) which is branched or not branched. For an increased thermal conductivity, $R_2$ is preferably a linear substituent that is not branched and further preferably a linear aliphatic hydrocarbon chain that is not branched. $R_2$ may be saturated or unsaturated and is preferably a saturated aliphatic hydrocarbon chain. $R_2$ containing no unsaturated bond allows a resin to obtain sufficient bendability and thus makes it easy to achieve a resin having a high thermal conductivity. $R_2$ is preferably a linear saturated aliphatic hydrocarbon chain having 4 to 20 carbon atoms, more preferably a linear saturated aliphatic hydrocarbon chain having 8 to 18 carbon atoms, and particularly preferably a linear saturated aliphatic hydrocarbon chain having 10 to 18 carbon atoms. $R_2$ preferably has a main chain length of an even number. With $R_2$ having a main chain length of an even number, it becomes easy to obtain a resin having a high thermal conductivity without having a decreased microscopic molecular orientation property.

A large difference between $R_1$ and $R_2$ in number of atoms in their main chain lengths decreases crystallinity and increases thin-wall molding processability and flexibility of a resulting molded article. Especially, from the viewpoint that a resin is obtained with decreased crystallinity and excellent flexibility, it is preferable that $R_1$ and $R_2$ satisfy the following general formula (4):

$$n - m \geq 4 \quad (4)$$

where m and n represent the numbers of atoms in main chain lengths of $R_1$ and $R_2$, respectively (i.e., m represents the number of atoms in the main chain length of $R_1$, and n represents the number of atoms in the main chain length of $R_2$).

Specifically, $R_2$ satisfying the general formula (4) is preferably one selected from $—(CH_2)_{10}—$, $—(CH_2)_{12}—$, and $—(CH_2)_{18}—$ in terms of chemical stability and availability.

The above-described resin used in the present invention may be copolymerized with another monomer, provided that the resin still can yield its effect. Examples of the another monomer include: aromatic hydroxycarboxylic acid, aromatic dicarboxylic acid, aromatic diol, aromatic hydroxylamine, aromatic diamine, aromatic aminocarboxylic acid, caprolactams, caprolactones, aliphatic dicarboxylic acid, aliphatic diol, aliphatic diamine, alicyclic dicarboxylic acid, alicyclic diol, aromatic mercaptocarboxylic acid, aromatic dithiol, and aromatic mercaptophenol.

Specific examples of the aromatic hydroxycarboxylic acid include: 4-hydroxybenzoic acid, 3-hydroxybenzoic acid, 2-hydroxybenzoic acid, 2-hydroxy-6-naphthoic acid, 2-hydroxy-5-naphthoic acid, 2-hydroxy-7-naphthoic acid, 2-hydroxy-3-naphthoic acid, 4'-hydroxyphenyl-4-benzoic acid, 3'-hydroxyphenyl-4-benzoic acid, and 4'-hydroxyphenyl-3-benzoic acid, each of which may or may not be substituted with an alkyl, alkoxy, or halogen.

Specific examples of the aromatic dicarboxylic acid include: terephthalic acid, isophthalic acid, 2,6-naphthalenedicarboxylic acid, 1,6-naphthalenedicarboxylic acid, 2,7-naphthalenedicarboxylic acid, 4,4'-dicarboxybiphenyl, 3,4'-dicarboxybiphenyl, 4,4''-dicarboxyterphenyl, bis(4-carboxyphenyl)ether, bis(4-carboxyphenoxy)butane, bis(4-carboxyphenyl)ethane, bis(3-carboxyphenyl)ether, and bis(3-carboxyphenyl)ethane, each of which may or may not be substituted with an alkyl, alkoxy, or halogen.

Specific examples of the aromatic diol include, for example, pyrocatechol, hydroquinone, resorcin, 2,6-dihydroxynaphthalene, 2,7-dihydroxynaphthalene, 1,6-dihydroxynaphthalene, 3,3'-dihydroxybiphenyl, 3,4'-dihydroxybiphenyl, 4,4'-dihydroxybiphenyl, 4,4'-dihydroxybiphenol ether, bis(4-hydroxyphenyl)ethane, 2,2'-dihydroxybinaphthyl, and the like, each of which may or may not be substituted with an alkyl, alkoxy, or halogen.

Specific examples of the aromatic hydroxylamine include: 4-aminophenol, N-methyl-4-aminophenol, 3-aminophenol, 3-methyl-4-aminophenol, 4-amino-1-naphthol, 4-amino-4'-hydroxybiphenyl, 4-amino-4'-hydroxybiphenyl ether, 4-amino-4'-hydroxybiphenyl methane, 4-amino-4'-hydroxybiphenyl sulfide, and 2,2'-diaminobinaphthyl, each of which may or may not be substituted with an alkyl, alkoxy, or halogen.

Specific examples of the aromatic diamine and the aromatic aminocarboxylic acid include: 1,4-phenylenediamine, 1,3-phenylenediamine, N-methyl-1,4-phenylenediamine, N,N'-dimethyl-1,4-phenylenediamine, 4,4'-diaminophenyl sulfide (thiodianiline), 4,4'-diaminobiphenyl sulfone, 2,5-diaminotoluene, 4,4'-ethylenedianiline, 4,4'-diaminobiphenoxyethane, 4,4'-diaminobiphenyl methane (methylenedianiline), 4,4'-diaminobiphenyl ether (oxydianiline), 4-aminobenzoic acid, 3-aminobenzoic acid, 6-amino-2-naphthoic acid, and 7-amino-2-naphthoic acid, each of which may or may not be substituted with an alkyl, alkoxy, or halogen.

Specific examples of the aliphatic dicarboxylic acid include: oxalic acid, malonic acid, succinic acid, glutaric acid, adipic acid, pimelic acid, suberic acid, azelaic acid, sebacic acid, dodecanedioic acid, tetradecanedioic acid, fumaric acid, and maleic acid.

Specific examples of the aliphatic diamine include: 1,2-ethylenediamine, 1,3-trimethylenediamine, 1,4-tetramethylenediamine, 1,6-hexamethylenediamine, 1,8-octanediamine, 1,9-nonanediamine, 1,10-decanediamine, and 1,12-dodecanediamine.

Specific examples of the alicyclic dicarboxylic acid, the aliphatic diol, and the alicyclic diol include: linear or branched aliphatic diols such as hexahydroterephthalic acid, trans-1,4-cyclohexanediol, cis-1,4-cyclohexanediol, trans-1,4-cyclohexanedimethanol, cis-1,4-cyclohexanedimethanol, trans-1,3-cyclohexanediol, cis-1,2-cyclohexanediol, trans-1,3-cyclohexanedimethanol, ethylene glycol, propylene glycol, butylene glycol, 1,3-propanediol, 1,2-propanediol, 1,4-butanediol, 1,6-hexanediol, 1,8-octanediol, 1,10-decanediol, 1,12-dodecanediol, neopentyl glycol, and reactive derivatives of these diols.

Specific examples of the aromatic mercaptocarboxylic acid, the aromatic dithiol, and the aromatic mercaptophenol include: 4-mercaptobenzoic acid, 2-mercapto-6-naphthoic acid, 2-mercapto-7-naphthoic acid, benzene-1,4-dithiol, benzene-1,3-dithiol, 2,6-naphthalene-dithiol, 2,7-naphthalene-dithiol, 4-mercaptophenol, 3-mercaptophenol, 6-mercapto-2-hydroxynaphthalene, 7-mercapto-2-hydroxynaphthalene, and reactive derivatives of these compounds.

A number average molecular weight of the resin used in the present invention is measured by GPC in which polystyrene is used as a standard, and a solution in which the resin used in the present invention is dissolved in a solvent in which p-chlorophenol and toluene are mixed in a volume ratio of 3:8 so as to be a 0.25% by weight solution is measured at 80° C. The resin used in the present invention has a number average molecular weight of preferably 3000 to 70000, more preferably 4000 to 60000, and further preferably 5000 to 50000. A number average molecular weight of not less than 3000 is preferable from the viewpoint of facilitating a resin having an identical primary structure to have a thermal conductivity of not less than 0.4 W/(m·K). Further, a number average molecular weight of not more than 70000 is preferable from the viewpoint of achieving excellent molding processability.

The resin concerned with the present invention can be produced by any well-known method. For the sake of simply controlling a structure, the resin concerned with the present invention is preferably produced by reacting (i) a compound having a reactive functional group at both polymer chain ends of the biphenyl group and (ii) a compound having a reactive functional group at both polymer chain ends of each of the linear substituents $R_1$ and $R_2$. Examples of such a reactive functional group encompass well-known groups such as a hydroxyl group, a carboxyl group, and an ester group. A condition under which such groups are caused to react with each other is not particularly limited.

For the sake of simply carrying out synthesis, a combination of the compound having a reactive functional group at both polymer chain ends of the biphenyl group and the compound having a reactive functional group at both polymer chain ends of each of the linear substituents $R_1$ and $R_2$ is preferably a combination of a compound having a hydroxyl group at both polymer chain ends of the biphenyl group and a compound having a carboxyl group at both polymer chain ends of each of the linear substituents $R_1$ and $R_2$.

One example of a method for producing a resin which is constituted by (i) the compound having a hydroxyl group at both polymer chain ends of the biphenyl group and (ii) the compound having a carboxyl group at both polymer chain ends of each of the linear substituents $R_1$ and $R_2$ is as follows: the hydroxyl groups of the compounds are individually or collectively converted to a lower fatty acid ester(s) with a lower fatty acid(s) such as acetic anhydride and then lower fatty acid-eliminating polycondensation reactions of the compounds and the compound having a carboxyl group at both polymer chain ends of each of the linear substituents $R_1$ and $R_2$ are carried out in a reaction vessel or in separate reaction vessels. The polycondensation reaction is carried out in a state in which (i) substantially no solvent and (ii) an inert gas such as nitrogen are contained, at a temperature generally in a range of 220° C. to 330° C. and preferably in a range of 240° C. to 310° C., under an ordinary pressure or under a reduced pressure for 0.5 hour to 5 hours. A reaction temperature of not lower than 220° C. is preferable from the viewpoint that the polycondensation reaction progresses rapidly at that reaction temperature, and a reaction temperature of not higher than 330° C. is preferable from the viewpoint that a side reaction such as decomposition is less likely to occur at that reaction temperature. In a case where the polycondensation reaction is carried out under the reduced pressure, it is preferable to gradually reduce the pressure. A gradually reduced pressure is preferable because it facilitates preventing volatilization of monomers having the linear substituents $R_1$ and $R_2$ and thus makes it easy to obtain a resin having a desired composition or a resin having a desired molecular weight. An ultimate degree of vacuum is preferably not more than 40 torr, more preferably not more than 30 torr, further preferably not more than 20 torr, and particularly preferably not more than 10 torr. A degree of vacuum of not more than 40 torr is preferable because it facilitates sufficient progress of the acid elimination and reduces a polymerization time. It is possible (i) to perform the polycondensation with multistages reaction temperatures or (ii) to perform the polycondensation in such a manner that a reaction product in a melted state is collected, as needed, while the reaction temperature is increasing or immediately after the reaction temperature reaches the maximum temperature. The resin thus obtained can be used as it is, or can be used after an unreacted raw material is removed therefrom or after being subjected to solid phase polymerization in order to improve a physical property of the resin. In a case where the solid phase polymerization is carried out, it is preferable that (i) the resin thus obtained is mechanically crushed into particles whose size is not more than 3 mm, preferably not more than 1 mm, and then (ii) the particles in a solid-phase state are processed, for 1 hour to 30 hours, at a temperature in a range of 100° C. to 350° C. (a) in an atmosphere of an inert gas such as nitrogen or (b) under a reduced pressure. A resin particle size of not more than 3 mm leads to a sufficient processing and is thus less likely to cause a physical property problem. It is preferable to select such a processing temperature and a heating rate for the solid phase polymerization that avoid fusion of the particles of the resin.

Examples of an acid anhydride of lower fatty acid which acid anhydride is used to produce the resin used in the present invention encompass an acid anhydride of a C2-05 lower fatty acid such as acetic anhydride, propionic acid anhydride, monochloroacetic acid anhydride, dichloroacetic acid anhydride, trichloroacetic acid anhydride, monobromoacetic acid anhydride, dibromoacetic acid anhydride, tribromoacetic acid anhydride, monofluoroacetic acid anhydride, difluoroacetic acid anhydride, trifluoroacetic acid anhydride, butyric anhydride, isobutyric acid anhydride, valeric acid anhydride, and pivalic acid anhydride. In particular, acetic anhydride, propionic acid anhydride, and trichloroacetic acid anhydride are preferably used. The acid anhydride of lower fatty acid is used in an equivalent weight of 1.01 to 1.5, and preferably of 1.02 to 1.2 with respect to a sum of amounts of functional groups, such as a hydroxyl group, contained in the monomer to be used. In a case where the acid anhydride of lower fatty acid is used in an equivalent weight of less than 1.01, it may be possible that since the acid anhydride of lower fatty acid is volatilized, functional groups such as a hydroxyl group insufficiently react with an anhydride of lower fatty acid, so that a resin having a low molecular weight is obtained.

For the production of the resin used in the present invention, a catalyst may be used. The catalyst can be a catalyst that has been conventionally well known as a polyester polymerization catalyst. Examples of such a catalyst include: metal salt catalysts such as magnesium acetate, stannous acetate, tetrabutyl titanate, lead acetate, sodium acetate, potassium acetate, and antimony trioxide; and organic compound catalysts such as N,N-dimethylaminopyridine and N-methylimidazole. The catalyst is generally added in $0.1 \times 10^{-2}$ to $100 \times 10^{-2}$% by weight, preferably $0.5 \times 10^{-2}$ to $50 \times 10^{-2}$% by weight, and more preferably $1 \times 10^{-2}$ to $10 \times 10^{-2}$% by weight with respect to a total weight of the resin.

According to the present invention, a ratio of a lamellar structure contained in the resin is preferably not less than 10 vol %. The ratio of the lamellar structure is preferably not less than 30 vol %, more preferably not less than 50 vol %, and particularly preferably not less than 70 vol %.

The lamellar structure referred to in the present invention corresponds to a plate-like shaped structure formed such that chain molecules are arranged in parallel to each other. The resin and the resin composition having a higher ratio of lamellar structure tend to have a higher thermal conductivity. Whether or not the lamellar structure is contained in the resin can be easily determined by use of scanning electron microscope (SEM) observation, transmission electron microscope (TEM) observation or X-ray diffraction.

The ratio of lamellar structure can be found out by directly observing, by a transmission electron microscope (TEM), a sample dyed with $RuO_4$. Specifically, the sample for the TEM observation is an ultrathin slice of 0.1 μm in thickness, prepared by cutting out a part of a molded cylindrical sample (6 mm in thickness×20 mm ϕ), dying with $RuO_4$, and then thinning the dyed sample with a microtome. The ultrathin slice thus prepared is observed by TEM at an acceleration voltage of 100 kV. From a photograph having a 40000×scale (18 cm×25 cm) thus obtained in the observation, it is possible to determine a lamellar structure region. A boundary of the lamellar structure region can be determined by identifying a region having a periodic contrast as the lamellar structure region. The lamellar structure is also distributed in a depth direction in the similar manner, so that the ratio of lamellar structure can be calculated as a ratio of the lamellar structure region with respect to a total area of the photograph.

The thermal conductivity of the resin composition in accordance with the present invention is preferably not less than 0.4 W/(m·K), more preferably not less than 1.0 W/(m·K), further preferably not less than 2.0 W/(m·K), particularly preferably not less than 5.0 W/(m·K), and most preferably not less than 10 W/(m·K). In a case where the thermal conductivity of the resin composition is less than 0.4 W/(m·K), heat generated from an electronic component is difficult to be efficiently exhausted outside. An upper limit of the thermal conductivity of the resin composition is not particularly limited, and it is preferable that the resin composition has a higher thermal conductivity. In general, the thermal conductivity of the resin composition to be used is not more than 100 W/(m·K), and further not more than 80 W/(m·K). The resin to be used in the present invention has excellent thermal conductivity, so that a highly thermally conductive resin composition having a thermal conductivity within the above-described range can be easily obtained.

The resin composition in accordance with the present invention contains an inorganic filler having a thermal conductivity of not less than 1 W/(m·K). As to an amount of the inorganic filler used, the resin and the inorganic filler are preferably used in a volume ratio of 95:5 to 20:80, more preferably 90:10 to 30:70, further preferably 80:20 to 40:60, and most preferably 70:30 to 40:60. A 95/5 or less volume ratio of the resin and the inorganic filler (the resin/the inorganic filler) makes it easy to obtain a resin composition having a satisfactory thermal conductivity. A 20/80 or greater volume ratio of the resin and the inorganic filler (the resin/the inorganic filler) is less likely to decrease the molding processability of an obtained resin composition. Since the resin used in the present invention has excellent thermal conductivity, the resin composition has excellent thermal conductivity even in case where the amount of the inorganic filler used is so small that the resin and the inorganic filler are used in a volume ratio of 95:5 to 70:30. Additionally, density of the resin composition can be reduced because the amount of the inorganic filler is small. A resin composition having excellent thermal conductivity and low density has an advantage when used for a heat-dissipating or heat-transferring resin material in various fields such as electric and electronic industries and automobile industries.

A wide range of well-known fillers can be used as the inorganic filler. The inorganic filler used is one having, by itself, a thermal conductivity of preferably not less than 1 W/(m·K), more preferably not less than 10 W/(m·K), further preferably not less than 20 W/(m·K), particularly preferably not less than 30 W/(m·K), and most preferably not less than 50 W/(m·K). An upper limit of the thermal conductivity of the inorganic filler itself is not particularly limited, and it is preferable that the thermal conductivity of the inorganic filler is higher. In general, the thermal conductivity of the inorganic filler itself to be used is preferably not more than 3000 W/(m·K), and further preferably not more than 2500 W/(m·K).

Inorganic fillers in various shapes can be employed as the inorganic filler. Examples of the various shapes encompass a particle, a fine particle, a nanoparticle, an agglomerated particle, a tube-like shape, a nanotube-like shape, a wire-like shape, a rod-like shape, a needle-like shape, a plate-like shape, an amorphous shape, a rugby ball-like shape, a hexahedron shape, a combined particle in which a large particle and a fine particle are combined with each other, and a liquid. Such an inorganic filler can be either natural or synthetic. In the case where the inorganic filler is natural, the inorganic filler is not particularly limited, e.g., as to location from which the inorganic filler comes from, and the inorganic filler can be appropriately selected from ones, which come from various locations. The inorganic filler can be used solely or in combination of two or more types of inorganic fillers which differ from each other in shape, average particle size, type, surface treatment agent, and/or the like.

An average particle size of the inorganic filler is preferably in a range of 0.1 μm to 300 μm, more preferably in a range of 1 μm to 150 μm, and particularly preferably in a range of 10 μm to 60 μm. An inorganic filler having an average particle size of not less than 0.1 μm is preferable because it allows an insulating membrane to easily have a sufficient value of thermal conductivity. An inorganic filler having an average particle size of not more than 300 μm is preferable because it is less likely to deteriorate the molding processability of an obtained resin composition. Provided that average particle sizes of inorganic fillers fall within the above ranges, two or more types of inorganic fillers may be mixed, and inorganic fillers having two or more different average particle sizes may be mixed. Especially, in filling a large amount of inorganic filler, mixing inorganic fillers having two or more different average particle sizes in a preferable ratio is preferable for decreasing melt viscosity of a resin composition.

In a case where the resin composition is used for an application in which the resin composition is not particularly required to have an electrical insulation property, the inorganic filler may be suitably a compound such as a metal compound and a conductive carbon compound. Among such materials, (i) a conductive carbon material such as graphite, carbon nanotube, and carbon fiber, (ii) conductive metal powder obtained by microparticulating various metals, (iii) conductive metal fiber obtained by processing various metals into a fiber form, (iv) various ferrites such as a soft magnetic ferrite, and (v) metal oxide such as zinc oxide, can be suitably used as the inorganic filler because these materials have excellent thermal conductivities.

In a case where the resin composition is used for an application in which the resin composition is required to have an electrical insulation property, the inorganic filler may be suitably a compound having an electrical insulation property. Here, the electrical insulation property means a property having an electrical resistance of not less than 1 Ω·cm. It is preferable to use, as the compound having an electrical insulation property, a compound having an electrical resistance of preferably not less than 10 Ω·cm, more preferably not less than $10^5$ Ω·cm, further preferably not less than $10^{10}$ Ω·cm, and most preferably not less than $10^{13}$ Ω·cm. An upper limit of the electrical resistance is not particularly limited. In general, a compound having an electrical resistance of not more than $10^{18}$ Ω·cm is used. It is preferable that a molded member obtained from the highly thermally conductive resin composition in accordance with the present invention also has an electrical insulation property within the above-mentioned range.

Among the inorganic fillers, specific examples of the compounds having an electrical insulation property encompass (i) metal oxides such as aluminum oxide, magnesium oxide, silicon oxide, beryllium oxide, copper oxide, and cuprous oxide, (ii) metal nitrides such as boron nitride, aluminum nitride, and silicon nitride, (iii) metal carbides such as silicon carbide, (iv) metal carbonates such as magnesium carbonate, (v) insulating carbon materials such as diamond, and (vi) metal hydroxides such as aluminum hydroxide and magnesium hydroxide. These compounds can be used solely or in combination of two or more types of compounds.

The inorganic filler may be one having been subjected to a surface treatment with a surface treatment agent such as a silane treatment agent, in order to attain better adhesiveness at an interface between the resin and the inorganic compound or to facilitate processability. Such a surface treatment agent is not particularly limited, and a conventionally well-known surface treatment agent such as a silane coupling agent and a titanate coupling agent can be used, for example. In particular, (i) a silane coupling agent containing an epoxy group such as epoxy silane, (ii) a silane coupling agent containing an amino group such as aminosilane, and (iii) a polyoxyethylene silane, are preferable because these silane coupling agents are less likely to reduce a physical property of the resin. A method for carrying out the surface treatment of the inorganic compound is not particularly limited, and a general surface treatment method can be used.

A wide range of well-known fillers for various purposes as required, other than the inorganic filler described above, can be used in the resin composition in accordance with the present invention. Since the resin itself has a high thermal conductivity, even in a case where the well-known filler having a relatively low thermal conductivity of less than 10 W/(m·K) is used, the resin composition has a high thermal conductivity. Examples of a filler other than the inorganic filler encompass diatomite powder, basic magnesium silicate, calcined clay, micronized silica, quartz powder, crystalline silica, kaolin, talc, antimony trioxide, micronized mica, molybdenum disulfide, inorganic fiber such as rock wool, ceramic fiber, and asbestos, and a glass filler such as glass fiber, glass powder, glass cloth, and molten silica. Use of such a filler makes it possible to increase a property such as a thermal conductivity, a mechanical strength, or abrasion resistance, which property is preferable for an application of the resin composition. Moreover, as needed, it is possible to blend, in combination, an organic filler such as paper, pulp, wood, a synthetic fiber (e.g., polyamide fiber, aramid fiber, and boron fiber), and resin powder (e.g., polyolefin powder).

As long as the effect of the present invention can be still attained, the resin composition in accordance with the present invention can contain any well-known resin such as an epoxy resin, a polyolefin resin, a bismaleimide resin, a polyimide resin, a polyether resin, a phenolic resin, a silicon resin, a polycarbonate resin, a polyamide resin, a polyester resin, a fluororesin, an acrylic resin, a melamine resin, a urea resin, and an urethane resin. Specific examples of a preferable resin encompass polycarbonate, polyethylene terephthalate, polybutylene terephthalate, a liquid crystal polymer, nylon 6, and nylon 6,6. With respect to 100 parts by weight of the resin of the resin composition in accordance with the present invention contained in the resin composition, an amount of such a well-known resin contained in the resin composition is generally in a range of 0 part by weight to 10000 parts by weight. The resin composition in accordance with the present invention may contain an epoxy compound, an acid anhydride compound, and/or an amine compound for the purpose of increasing a strength of adhesion to a metal.

The resin composition in accordance with the present invention may contain an additive for any purpose as required, other than the resin and the filler described above, provided that the effect of the present invention can be still attained. For example, any other component such as a reinforcing agent, a thickener, a mold releasing agent, a coupling agent, a flame retardant, a flame resistant agent, a pigment, a coloring agent, and other auxiliary agents can be added to the resin composition in accordance with the present invention. Such an additive is preferably used in a range of 0 part by weight to 100 parts by weight in total with respect to 100 parts by weight of the resin. Note here that the resin in "with respect to 100 parts by weight of the resin" means the whole resin contained in the resin composition in accordance with the present invention. Especially, the addition of a flame retardant is preferable for imparting flame retardancy to the resin composition. Flame retardancy of the resin composition needs to satisfy V-0 of the UL-94 standard. This is a prerequisite for the resin composition to be adopted in electric and electronic devices that deal with large currents.

The amount of the flame retardant used is more preferably 7 to 80 parts by weight, further preferably 10 to 60 parts by weight, and still further preferably 12 to 40 parts by weight, with respect to 100 parts by weight of the resin. Note here that the resin in "with respect to 100 parts by weight of the resin" means the whole resin contained in the resin composition of the present invention. As the flame retardant, various kinds of known flame retardants can be used. Non-limiting examples of the flame retardant include various flame retardants described in, for example, "Techniques and applications of polymer flame retardation" (p149-221), published by CMC Publishing Co., Ltd. Among these flame retardants, phosphorus-based flame retardants, halogen-based flame retardants, inorganic flame retardants can be preferably used.

The phosphorus-based flame retardants include, for example, phosphate ester, halogen-containing phosphate ester, condensed phosphate ester, polyphosphate, and red phosphorus. These phosphorus-based flame retardants may be used alone or in combination of two or more thereof. Specifically, the halogen-based flame retardants are brominated polystyrene, brominated polyphenylene ether, a brominated bisphenol-type epoxy-based polymer, a brominated styrene maleic anhydride polymer, a brominated epoxy resin, a brominated phenoxy resin, decabromodiphenyl ether, decabromobiphenyl, brominated polycarbonate, perchlorocyclopentadecane, a brominated cross-linked aromatic polymer. Particularly preferable are brominated polystyrene and brominated polyphenylene ether. These halogen-based flame retardants may be used alone or in combination of two or more thereof. Further, it is preferable that a halogen element content of these halogen-based flame retardants is 15% to 87%.

Specific examples of the inorganic flame retardants include aluminum hydroxide, antimony trioxide, antimony pentoxide, sodium antimonate, tin oxide, zinc oxide, iron oxide, magnesium hydroxide, calcium hydroxide, zinc borate, kaolin clay, and calcium carbonate. These inorganic compounds may be treated with a silane coupler, a titanium coupler, or the like and may be used alone or in combination of two or more thereof.

A method of producing the resin composition in accordance with the present invention is not limited in particular. For example, the resin composition can be produced in such a way that (i) the aforementioned components, additives, and the like are dried and then (ii) the components, additives, and the like are melt-kneaded with use of a melt-kneading machine such as a signal- or twin-screw extruder. In a case where the components and the like to be added are liquid, the components and the like are put in the melt-kneading machine with use of, for example, a liquid supply pump before melt-kneading is finished. Further, the resin composition can also be produced by dissolving the resin in a solvent, mixing the inorganic filler in the solution by stirring, and then removing the solvent by drying. The resin composition in accordance with the present invention can be molded by, for example, injection molding, extrusion molding, press molding, and blow molding, or the like resin molding method.

According to the resin composition in accordance with the present invention, the resin molecular chains can be oriented in the thickness direction of the molded article by the shear flow field during the molding, so that a thermal conductivity in the thickness direction of the molded article is further increased. In order that the molecular chains are oriented in the thickness direction by the shear flow field, it is preferable that the resin in a smectic liquid crystalline state is placed in the shear flow field. A simple method for utilizing the shear flow field is, for example, an injection molding method. The injection molding is a molding method according to which: an injection molding machine is equipped with a mold; a resin composition which has been melted and plasticized is injected into the mold at a high speed and cooled to be solidified in the injection molding machine; and a resultant molded article is taken out. More specifically, a resin is heated so as to be a smectic liquid crystalline state, and then injected into the mold. Here, a temperature of the mold is set preferably at $T_m-100°$ C. or higher, more preferably at $T_m-80°$ C. or higher, and further preferably at $T_m-50°$ C. or higher so that the molecular chains are highly oriented. Note here that $T_m$ is a melting point of the resin. In order that the resin molecular chains are oriented in the thickness direction, a number average molecular weight of the resin is preferably in a range of 3000 to 40000, more preferably in a range of 4000 to 30000, and further preferably in a range of 5000 to 20000.

The resin composition in accordance with the present invention can be widely used for various applications such as an electronic material, a magnetic material, a catalytic material, a structure material, an optical material, a medical material, an automotive material, and an architectural material. In particular, since the resin composition in accordance with the present invention has excellent properties, that is, both molding processability and a high thermal conductivity, the resin composition in accordance with the present invention is extremely useful as a heat releasing or heat conducting resin material.

The resin composition in accordance with the present invention can be preferably employed for an injection-molded product such as household electrical appliances, OA equipment parts, AV equipment parts, automotive exterior and interior parts, and the like. In particular, the resin composition in accordance with the present invention can be preferably employed as an exterior material in household electrical appliances and OA equipment each of which generates a large amount of heat. Moreover, the resin composition in accordance with the present invention is preferably employed as an exterior material of an electronic device in which a heating source is included but it is difficult to carry out a forced cooling by a fan or the like in order that heat generated inside of the electronic device may be released to outside of the electronic device. In particular, the resin composition in accordance with the present invention is extremely useful as a resin for a casing, a housing, or an external material for (i) a portable computer such as a laptop personal computer and (ii) a small-sized or portable electronic device such as a PDA, a mobile phone, a portable game machine, a portable music player, a portable TV/video device, and a portable video camera. Further, the resin composition in accordance with the present invention is also extremely useful as a resin for battery peripheral of a vehicle, a train, and the like, a resin for a portable battery of household electrical appliances, a resin for a power distribution part such as a breaker, and a sealing material for a motor.

The resin composition in accordance with the present invention can be further caused to have a high thermal conductivity and excellent molding processability, as compared to conventionally well-known resins and resin compositions. For this reason, the resin composition in accordance with the present invention has a useful property as a part or housing for the applications described above.

Further, the resin composition in accordance with the present invention has flexibility and is therefore suitable for use in a thermally conductive membrane. Here, the thermally conductive membrane can also be called "thermally conductive sheet", "thermally conductive film", etc. by its thickness. A thickness of the thermally conductive membrane in accordance with the present invention is preferably not more than 500 μm. A thickness of not more than 500 μm is preferably for achieving a thermally conductive membrane having a decreased thermal resistance and for achieving a heating element capable of exerting a sufficient heat-dissipation effect. For the purpose of decreasing the thermal resistance, the thickness of the thermally conductive membrane is preferably not more than 300 μm. more preferably not more than 200 μm, and further preferably not more than 100 μm. A lower limit of the thickness of the thermally conductive membrane is not particularly limited. However, for the purpose of ensuring dielectric breakdown strength of the membrane or the like purpose, the thickness is generally not less than 10 μm, preferably not less than 30 μm, and more preferably not less than 50 μm.

The thermally conductive membrane in accordance with the present invention is preferably electrically insulative. The thermally conductive membrane being electrically insulative has a dielectric breakdown strength of preferably not less than 10 kV/mm, more preferably not less than 15 kV/mm, further preferably not less than 20 kV/mm, and most preferably not less than 25 kV/mm. The thermally conductive membrane having a dielectric breakdown strength of not less than 10 kV/mm is preferable from the viewpoint of being able to be used in electric and electronic devices that deal with large currents.

An insulating membrane in accordance with the present invention may also be combined with other base material. In applications that require insulating properties, the base material includes insulating base materials such as Kraft paper, glass cloth, nonwoven glass fabric, aramid paper, and mica sheet. In applications that do not require insulating properties, not only the above-listed insulating base materials but also non-isolating base materials such as carbon fiber-based nonwoven fabric and cloth can be used as the base material. The thermally conductive membrane in accordance with the present invention has high thermal conductivity in the thickness direction. Further, the resin composition constituting the thermally conductive membrane has low specific gravity and good molding processability since the resin composition eliminates the need for a large amount of thermally conductive inorganic filler for the purpose of achieving its high thermal conductivity. Such a thermally conductive membrane can be suitably used especially as a thermally conductive insulating paper and further especially as an insulating layer provided to ensure insulation between a metal substrate and a conductive foil for forming a wiring pattern, in electric and electronic devices such as a light emitting diode (LED), a generator, a motor, a transformer, a current transformer, a voltage regulator, a rectifier, an inverter, and a charger. Further, an electronic circuit board configured as such has high heat dissipation performance and can therefore contribute to further miniaturization and sophistication of the electric and electronic devices.

EXAMPLES

The following description will more specifically discuss the resin composition in accordance with the present invention with reference to Production Examples, Examples, and Comparative Examples. It should be noted that the present invention is not limited to such Examples. Note that reagents manufactured by Wako Pure Chemical Industries, Ltd. were used below without being refined, unless otherwise specified.

[Evaluation Method]

Number average molecular weight: A sample was prepared by dissolving the resin used in the present invention in a mixed solvent that contains p-chlorophenol (manufactured by Tokyo Chemical Industry Co., Ltd.) and toluene in a volume ratio of 3:8 so that the sample has a concentration of 0.25% by weight. Polystyrene was used as a standard material for preparing a similar sample solution. The measurement was carried out by high-temperature GPC (manufactured by Viscotek Corporation; 350 HT-GPC System) under conditions where a column temperature was 80° C., and a flow rate was 1.00 mL/min. A differential refractometer (RI) was used as a detector.

Evaluations of phase transition temperature and resin crystallinity and liquid crystallinity: In differential scanning calorimetry (DSC Measurement), a first temperature rise was produced at a rate of 10° C./min in a range from 50° C. to 300° C., and a temperature fall was then produced at a rate of 10° C./min in a range from 300° C. to 50° C. Further, a second temperature rise at a rate of 10° C./min was produced. From a peak top of an endothermic peak in the second temperature rise, a transition point ($T_s$) from a solid phase to a liquid crystal phase and a transition point ($T_i$) from a liquid crystal phase to an isotropic phase were obtained. Further, from peak areas of $T_s$ and $T_i$ were obtained phase transition enthalpies ($\Delta H_S$ and $\Delta H_i$, J/g), which served as indices of resin crystallinity and liquid crystallinity.

Molding of test piece: A resin or a resin composition was dried at 120° C. for 4 hours with use of a hot air drier and then molded into disk-shaped samples of 1 mm in thickness×250 mm ϕ and membrane samples of 80 mm×80 mm×150 μm in thickness by a press molding machine. In doing so, a press temperature was set at a temperature higher by 10° C. than the isotropic phase transition point ($T_i$) of the resin.

Thermal conductivity: With use of the disk-shaped sample (1 mm in thickness×25 mm ϕ), a thermal conductivity in a thickness direction of the sample at room temperature in the atmosphere was measured by a laser flash method thermal conductivity measuring device (manufactured by Netzsch Inc.; LFA447).

Thin wall moldability evaluation: A resin composition successfully molded into a membrane sample of 80 mm×80 mm×150 μm in thickness without cracks was rated as "G (good)", and a resin composition molded into a membrane sample suffering cracks was rated as "P (poor)".

Figure 1:
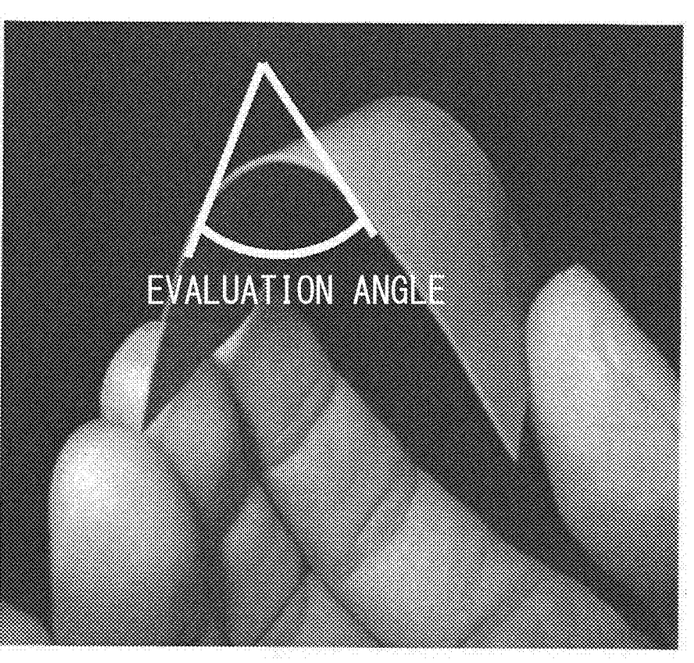
FIG. 1 is a view illustrating an angle of a membrane sample used for a flexibility evaluation.

Flexibility evaluation: A membrane sample (80 mm×80 mm×150 μm in thickness) capable of being bent at 90 degrees, concerning an angle shown in FIG. 1, was rated as "G (good)". A membrane sample capable of being bent at 120 degrees but broken at 90 degrees was rated as "U (Unsatisfactory)", and a membrane sample broken at 120 degrees was rated as "P (poor)".

Determination of polymer chain end carboxyl group: A ratio of carboxyl group polymer chain end was measured on the basis of an integral value of a property signal of each polymer chain end group by use of 1H-NMR (measured at 400 MHz in a solvent containing deuterated chloroform and trifluoroacetic acid in a volume ratio of 2:1). Table 1 shows a chemical shift value of typical signals which were used in the measurement.

TABLE 1

| Types of polymer chain end group | Chemical shift value of property signal |
| --- | --- |
| —⟨phenyl⟩—O—C(=O)—CH₃ | δ 2.45 ppm |
| —CH₂—C(=O)—OH | δ 2.49 ppm |

Materials Used

[Resins]

Production Example 1

Into a sealed reactor vessel equipped with a reflux condenser, a thermometer, a nitrogen introduction tube, and a stirring rod, 4,4'-dihydroxybiphenyl, sebacic acid, and tetradecanedioic acid were placed in a ratio of 48:39:13 by mol %, respectively. To the ingredients were then added (i) 2.1 equivalent of acetic anhydride with respect to 4,4'-dihydroxybiphenyl and (ii) a catalyst quantity of sodium acetate. The mixture was reacted under an ordinary pressure in an atmosphere of nitrogen at 145° C., so as to obtain a homogeneous solution. Subsequently, a temperature of the solution thus obtained was raised to 260° C. at 2° C./min while acetic acid was distilled away, and the solution was stirred at 260° C. for 1 hour. A pressure of the sealed reactor vessel was reduced to 10 torr over approximately 60 minutes with the temperature maintained, and then the reduced pressure was maintained. In 2 hours after the start of the pressure reduction, the pressure was brought back to an ordinary pressure by use of a nitrogen gas, and then a polymer thus generated was taken out. The resin thus obtained showed a number average molecular weight of 14,000, a thermal conductivity of the resin itself of 0.46 W/(m·K), a polymer chain end carboxyl group of not less than 99%, $T_s$ of 121° C., and $T_i$ of 251° C. The resin thus obtained also showed $\Delta H_s$ of 3.8 J/g and $\Delta H_i$ of 48 J/g. The resin thus obtained is referred to as resin (A-1).

Production Example 2

A resin was obtained as in Production Example 1 except that 4,4'-dihydroxybiphenyl, tetradecanedioic acid, and eicosanedioic acid were placed as ingredients in a ratio of 48:26:26 by mol respectively. The resin thus obtained showed a number average molecular weight of 16,000, a thermal conductivity of the resin itself of 0.43 W/(m·K), $T_s$ of 110° C., and $T_i$ of 201° C. The resin thus obtained also showed $\Delta H_s$ of 3.3 J/g and $\Delta H_i$ of 54 J/g. The resin thus obtained is referred to as resin (A-2).

Production Example 3

Into a sealed reactor vessel equipped with a reflux condenser, a thermometer, a nitrogen introduction tube, and a stirring rod, 4,4'-dihydroxybiphenyl, sebacic acid, and tetradecanedioic acid were placed in a ratio of 50:37.5:12.5 by mol %, respectively. To the ingredients were then added (i) 2.1 equivalent of acetic anhydride with respect to 4,4'-dihydroxybiphenyl and (ii) a catalyst quantity of 1-methylimidazole. The mixture was reacted under an ordinary pressure in an atmosphere of nitrogen at 145° C., so as to obtain a homogeneous solution. Subsequently, a temperature of the solution thus obtained was raised to 260° C. at 2°

C./min while acetic acid was distilled away, and the solution was stirred at 260° C. for 1 hour. A pressure of the sealed reactor vessel was reduced to 10 torr over approximately 60 minutes with the temperature maintained, and then the reduced pressure was maintained. In 2 hours after the start of the pressure reduction, the pressure was brought back to an ordinary pressure by use of a nitrogen gas, and then a polymer thus generated was taken out. The resin thus obtained showed a number average molecular weight of 73,000, a thermal conductivity of the resin itself of 0.45 W/(m·K), $T_s$ of 121° C., and $T_i$ of 253° C. The resin thus obtained also showed $\Delta H_s$ of 3.7 J/g and $\Delta H_i$ of 49 J/g. The resin thus obtained is referred to as resin (A-3).

Production Example 4

Into a sealed reactor vessel equipped with a reflux condenser, a thermometer, a nitrogen introduction tube, and a stirring rod, 4,4'-dihydroxybiphenyl, sebacic acid, and dodecanedioic acid were placed in a ratio of 50:37.5:12.5 by mol %, respectively. To the ingredients were then added (i) 2.1 equivalent of acetic anhydride with respect to 4,4'-dihydroxybiphenyl and (ii) a catalyst quantity of 1-methylimidazole. The mixture was reacted under an ordinary pressure in an atmosphere of nitrogen at 145° C., so as to obtain a homogeneous solution. Subsequently, a temperature of the solution thus obtained was raised to 260° C. at 2° C./min while acetic acid was distilled away, and the solution was stirred at 260° C. for 1 hour. A pressure of the sealed reactor vessel was reduced to 10 torr over approximately 60 minutes with the temperature maintained, and then the reduced pressure was maintained. In 2 hours after the start of the pressure reduction, the pressure was brought back to an ordinary pressure by use of a nitrogen gas, and then a polymer thus generated was taken out. The resin thus obtained showed a number average molecular weight of 56,000, a thermal conductivity of the resin itself of 0.45 W/(m·K), $T_s$ of 190° C., and $T_i$ of 272° C. The resin thus obtained also showed $\Delta H_S$ of 17 J/g and $\Delta H_i$ of 48 J/g. The resin thus obtained is referred to as resin (A-4).

Production Example 5

Into a sealed reactor vessel equipped with a reflux condenser, a thermometer, a nitrogen introduction tube, and a stirring rod, 4,4'-dihydroxybiphenyl and dodecanedioic acid were placed in a ratio of 48:52 by mol %, respectively. To the ingredients were then added (i) 2.1 equivalent of acetic anhydride with respect to 4,4'-dihydroxybiphenyl and (ii) a catalyst quantity of 1-methylimidazole. The mixture was reacted under an ordinary pressure in an atmosphere of nitrogen at 145° C., so as to obtain a homogeneous solution. Subsequently, a temperature of the solution thus obtained was raised to 270° C. at 2° C./min while acetic acid was distilled away, and the solution was stirred at 270° C. for 1 hour. A pressure of the sealed reactor vessel was reduced to 10 torr over approximately 60 minutes with the temperature maintained, and then the reduced pressure was maintained. In 2 hours after the start of the pressure reduction, the pressure was brought back to an ordinary pressure by use of a nitrogen gas, and then a polymer thus generated was taken out. The resin thus obtained showed a number average molecular weight of 11,000, a thermal conductivity of the resin itself of 0.52 W/(m·K), $T_s$ of 203° C., and $T_i$ of 253° C. The resin thus obtained also showed $\Delta H_s$ of 24 J/g and $\Delta H_i$ of 47 J/g. The resin thus obtained is referred to as resin (A-5).

Production Example 6

A resin was obtained as in Production Example 5 except that 4,4'-dihydroxybiphenyl and dodecanedioic acid were placed in a ratio of 50:50 by mol %, respectively. The resin thus obtained showed a number average molecular weight of 60,000, a thermal conductivity of the resin itself of 0.42 W/(m·K), $T_s$ of 203° C., and $T_i$ of 253° C. The resin thus obtained also showed $\Delta H_s$ of 29 J/g and $\Delta H_i$ of 55 J/g. The resin thus obtained is referred to as resin (A-6).

A commercially available polycarbonate resin (TARFLON A2200 produced by Idemitsu Kosan Co., Ltd.) is referred herein to as resin (A-7).

<Inorganic Fillers>

(B-1) Alumina powder (DAW03, produced by Denka Co., Ltd.; a thermal conductivity in pure form: 30 W/(m·K); a volume average particle size: 3 μm; electrically insulative)

(B-2) Alumina powder (AS-50, produced by SHOWA DENKO KABUSHIKI KAISHA; a thermal conductivity in pure form: 30 W/(m·K); a volume average particle size: 9 μm; electrically insulative)

(B-3) Magnesium oxide powder (RF-50-SC, produced by Ube Material Industries, Ltd.; a thermal conductivity in pure form: 42 W/(m·K); a volume average particle size: 50 μm; electrically insulative)

(B-4) Aluminum nitride powder (H-Grade, produced by Tokuyama Corporation; a thermal conductivity in pure form: 170 W/(m·K); a volume average particle size: 1 μm; electrically insulative)

(B-5) Agglomerated boron nitride powder (SGPS, produced by Denka Co., Ltd.; a thermal conductivity in pure form: 60 W/(m·K); a volume average particle size: 12 μm; electrically insulative)

(B-6) Spherical graphite powder (CGC-100, produced by Chuetsu Graphite Works Co., Ltd.; a thermal conductivity in pure form: not less than 100 W/(m·K); a volume average particle size: 90 μm; electrically conductive)

Example 1

The resin (A-1) was dried at 120° C. for 4 hours with use of a hot air drier and then dissolved in N-methylpyrrolidone (NMP) at 170° C. To the solution, the inorganic filler (B-1) was added such that a volume ratio between the resin (A-1) and the inorganic filler (B-1) was 90:10. The mixture was stirred for 10 minutes. The varnish thus obtained was added to toluene being stirred, so that the resin was precipitated out of the solution. Then, a solid content was filtered, and then cleaned with methanol three times to obtain a resin composition. The resin composition was dried at 120° C. for 4 hours with use of a hot air drier. The resin composition thus dried was molded into the given shapes with use of a press molding machine, and was then evaluated for thermal conductivity in a thickness direction, thin wall moldability, and flexibility. Results of the evaluation are shown in Table 2.

Examples 2 to 7 and Comparative Examples 1 to 3

Resin compositions were obtained as in Example 1 except that different types of resins and inorganic fillers were used as shown in Table 2 and that the inorganic fillers were used in different amounts as shown in Table 2. Individual resin amounts were amounts obtained by subtracting the amounts of inorganic fillers shown in Table 2 from 100 vol %. The resin composition thus obtained was molded into the given shapes with use of a press molding machine, and was then evaluated for thermal conductivity in a thickness direction, thin wall moldability, and flexibility. Results of the evaluation are shown in Table 2.

TABLE 2

| | | Ex. 1 | Ex. 2 | Ex. 3 | Ex. 4 | Ex. 5 | Ex. 6 | Ex. 7 | Com. Ex. 1 | Com. Ex. 2 | Com. Ex. 3 | Com. Ex. 4 |
|---|---|---|---|---|---|---|---|---|---|---|---|---|
| Resin | | A-1 | A-1 | A-2 | A-3 | A-3 | A-4 | A-1 | A-5 | A-6 | A-7 | A-7 |
| Inorganic filler [vol %] | B-1 | 10 | | | | | 10 | | 10 | 10 | 10 | |
| | B-2 | | 50 | | | | | | | | | 50 |
| | B-3 | | | 30 | | | | | | | | |
| | B-4 | | | | 50 | | | | | | | |
| | B-5 | | | | | 44 | | | | | | |
| | B-6 | | | | | | | 30 | | | | |
| Thermal conductivity [W/(m·K)] | | 1.2 | 4.7 | 2.7 | 5.8 | 7.0 | 1.2 | 7.0 | 1.2 | 1.0 | 0.35 | 1.4 |
| Thick wall moldability | | G | G | G | G | G | G | G | P | G | G | G |
| Flexibility | | G | G | G | G | G | U | G | P | P | G | G |

Note:
"Ex." refers to Example, and "Com. Ex." refers to Comparative Example.

Example 8

The resin (A-1) was dried at 120° C. for 4 hours with use of a hot air drier and then dissolved in N-methylpyrrolidone (NMP) at 170° C. To the solution, the inorganic filler (B2) was added such that a volume ratio between the resin (A-1) and the inorganic filler (B-2) was 50:50. The mixture was stirred for 10 minutes. To the mixture, 6 parts by weight of epoxy resin (YX4000, produced by Mitsubishi Chemical Corporation) and a catalyst quantity of triphenylphosphine were added with respect to 100 parts by weight of resin. The mixture was stirred for 1 minute. The varnish thus obtained was thinly spread over a stainless steel plate and then dried at 120° C. for 4 hours with use of a hot air drier to obtain a resin composition powder. With use of a press molding machine, the resin composition powder thus obtained was molded into a membrane sample of 80 mm×80 mm×150 µm in thickness. The membrane sample showed thermal conductivity in a thickness direction of 3.0 W/(m·K) and "G" in both thin wall moldability and flexibility. After 3 minutes of solder reflow test at 260° C., external appearance of a molded article remained unchanged.

The resin used in Comparative Example 1 has high crystallinity due to high orderliness of the molecular structure. Thus, it can be seen that the resin composition in Comparative Example 1 has a significantly higher thermal conductivity than that in Comparative Example 3, but cannot be molded into a thin wall. Comparative Example 2 shows "G" in thin wall moldability due to a greatly increased molecular weight of a resin, but shows insufficient flexibility. On the other hand, in Example 1, a resin used has relatively low crystallinity, but maintains high liquid crystallinity. Therefore, it can be seen that the resin composition maintaining a high thermal conductivity and having both thin wall moldability and flexibility is obtained in Example 1. Further, in Examples 2 to 7, the thermal conductivity is greatly increased with increase in the amount of inorganic filler to be blended. Therefore, it can be seen that with the resins of a variety of molecular structures, the resin compositions having both thin wall moldability and flexibility are obtained in Examples 2 to 7. From comparison between Example 2 and Comparative Example 4, it can be seen that the resin composition in accordance with the present invention yields effectiveness for high thermal conduction three to four times higher than that of a resin composition in which a general-purpose resin is used. In Example 8, the resin composition in accordance with the present invention is mixed with an epoxy resin and a curing catalyst, so that a polymer chain end carboxyl group of the resin used in the present invention and an epoxy group of an epoxy resin are reacted for curing. As a result, a thermally conductive membrane having resistance to solder reflow is obtained. From comparison to Comparative Example 4, it can be seen that the resin composition in Example 8, which contains the same amount of inorganic filler as that in Comparative Example 4, has a high thermal conductivity.

Industrial Applicability

A resin composition in accordance with the present invention exhibits excellent thermal conductivity and has both thin wall moldability and flexibility. Such a resin composition is industrially useful for its capability of being used for a heat-releasing or heat-transferring resin material in various fields such as electric and electronic industries and automobile industries and especially for a thermally conductive membrane.

The invention claimed is:
1. A resin composition comprising:
a resin having a main chain structure including:
a unit (A) by 40 mol % to 60 mol %, the unit (A) having a biphenyl group and being represented by general formula (1):

[Chem. 1]

(1)

a unit (B) by 5 mol % to 40 mol %, the unit (B) being represented by general formula (2):

(2)

wherein $R_1$ represents a bivalent linear substituent (a) whose number of atoms in its main chain length is 2 to 18 and (b) which is branched or not branched; and
a unit (C) by 5 mol % to 40 mol %, the unit (C) being represented by general formula (3):

(3)

wherein $R_2$ represents a bivalent linear substituent (a) whose number of atoms in its main chain length is 4 to 20 and is larger than the number of atoms in the main chain length of $R_1$ and (b) which is branched or not branched, where a total amount of the units (A), (B), and (C) is 100 mol %, and a thermal conductivity of the resin itself is not less than 0.4 W/(m·K); and an inorganic filler having thermal conductivity of not less than 1 W/(m·K).

2. The resin composition as set forth in claim 1, wherein $R_1$ and $R_2$ of the resin are linear saturated aliphatic hydrocarbon chains.

3. The resin composition as set forth in claim 1, wherein $R_1$ and $R_2$ of the resin have respective main chain lengths of even numbers.

4. The resin composition as set forth in claim 1, wherein $R_1$ and $R_2$ satisfy general formula (4):

$$n-m \geq 4 \qquad (4)$$

where m represents the number of atoms in the main chain length of $R_1$, and n represents the number of atoms in the main chain length of $R_2$.

5. The resin composition as set forth in claim 1, wherein the resin has a number average molecular weight of 3000 to 70000.

6. The resin composition as set forth in claim 1, wherein the inorganic filler is one or more electrically-insulative highly thermally conductive inorganic compounds selected from the group consisting of boron nitride, aluminum nitride, silicon nitride, aluminum oxide, magnesium oxide, aluminum hydroxide, magnesium hydroxide, and diamond.

7. The resin composition as set forth in claim 1, wherein the inorganic filler is one or more electrically-conductive highly thermally conductive inorganic compounds selected from the group consisting of graphite, a carbon nanotube, electrically-conductive metal powder, soft magnetism ferrite, carbon fiber, electrically-conductive metal fiber, and zinc oxide.

8. A heat-dissipating or heat-transferring resin material containing a resin composition as set forth in claim 1.

9. A thermally conductive membrane containing a resin composition as set forth in claim 1.

10. The resin composition as set forth in claim 1, wherein not less than 90% of all chain ends of the resin are blocked with a monoamine or aliphatic monocarboxylic acid having 1 to 20 carbon atoms, the monoamine or aliphatic monocarboxylic acid being an end blocking agent.

* * * * *